US005515084A

United States Patent [19]

Larson

[11] Patent Number: 5,515,084

[45] Date of Patent: May 7, 1996

[54] METHOD FOR NON-IMPACT PRINTING UTILIZING A MULTIPLEXED MATRIX OF CONTROLLED ELECTRODE UNITS AND DEVICE TO PERFORM METHOD

[75] Inventor: Ove Larson, Hagen-Langedrag, Sweden

[73] Assignee: Array Printers AB, Molndal, Sweden

[21] Appl. No.: 63,902

[22] Filed: May 18, 1993

[51] Int. Cl.[6] .............................. B41J 2/06; G01D 15/06

[52] U.S. Cl. .............................................. 347/55; 347/123

[58] Field of Search .............................. 346/159; 347/55, 347/123

[56] References Cited

U.S. PATENT DOCUMENTS

| | | | |
|---|---|---|---|
| 3,689,935 | 9/1972 | Pressman et al. | 346/159 |
| 4,274,100 | 6/1981 | Pond | 347/55 |
| 4,384,296 | 5/1983 | Torpey | 347/55 |
| 4,470,056 | 9/1984 | Galetto et al. | 346/159 |
| 4,478,510 | 10/1984 | Fujii et al. | 346/159 |
| 4,498,090 | 2/1985 | Honda et al. | 346/159 |
| 4,814,796 | 3/1989 | Schmidlin | 346/159 |
| 4,860,036 | 8/1989 | Schmidlin | 346/159 |
| 5,028,812 | 7/1991 | Bartky | 307/246 |
| 5,036,341 | 7/1991 | Larrson | 346/159 |
| 5,038,159 | 8/1991 | Schmidlin et al. | 346/159 |
| 5,083,137 | 1/1992 | Badyal et al. | 346/140 R |
| 5,121,144 | 6/1992 | Larson et al. | 346/159 |
| 5,170,185 | 12/1992 | Takemura et al. | 347/55 |
| 5,204,696 | 4/1993 | Schmidlin et al. | 346/159 |
| 5,214,451 | 5/1993 | Schmidlin et al. | 347/55 |
| 5,257,045 | 10/1993 | Bergen et al. | 346/159 |

FOREIGN PATENT DOCUMENTS

| | | |
|---|---|---|
| 9014960 | 12/1990 | WIPO . |

*Primary Examiner*—Peter S. Wong
*Assistant Examiner*—Randy W. Gibson
*Attorney, Agent, or Firm*—Knobbe, Martens, Olson & Bear

[57] ABSTRACT

Method and device for high quality printing with substantially reduced cross-coupling while reducing the manufacturing cost of printers that use a matrix of individual control electrode units by connecting individual control electrode segments in series to reduce the number of electronic drive circuits. An information carrier such as paper is placed between a back electrode and an electrode matrix both of which are connected to voltage sources. Voltage sources connected to the control electrode unit matrix at least partially open and close passages through the electrode matrix; charged pigment particles attracted from a particle carrier through the open passages are deposited on the information carrier to form visible images.

22 Claims, 4 Drawing Sheets

METHOD FOR NON-IMPACT PRINTING UTILIZING A MULTIPLEXED MATRIX OF CONTROLLED ELECTRODE UNITS AND DEVICE TO PERFORM METHOD

FIELD OF THE INVENTION

This invention relates to electrographical printing devices and, more particularly, to an improved direct electrostatic printing device utilizing a multiplexed matrix of control electrode units and a method of using the device to form a clear image at a reduced manufacturing cost.

BACKGROUND OF THE INVENTION

Of the various electrostatic printing techniques, the most familiar and widely utilized is that of xerography wherein latent electrostatic images formed on a charge retentive surface, such as a roller, are developed by a suitable toner material to render the images visible, the images being subsequently transferred to plain paper. This process is called an indirect or transfer processes because it first forms a visible image on an intermediate photoreceptor and then transfers that image to a paper surface.

Another form of electrostatic printing is one that has come to be known as direct electrostatic printing (DEP). This form of printing differs from the aforementioned xerographic form in that pigmented particles (i.e. toner or developing material) are deposited directly onto a plain (i.e. not specially treated) information carrier to form a visible image. In general, this type of printing device uses electrostatic fields controlled by addressable electrodes for allowing passage of pigment particles through selected apertures in a printhead structure. A separate electrostatic field is provided to attract the pigment particles to an imaging substrate in image configuration.

Many of the methods used in field imaging, (e.g., creating an electric field pattern in the print zone), such as particle charging, particle transport, and particle fusing are similar to those used in "laser printers". However, the novel feature of direct printing is its simplicity of simultaneous field imaging and particle transport to produce a visible image directly on plain paper.

U.S. Pat. No. 3,689,935 granted to Pressman discloses a method to produce text and pictures with pigment particles on an information carrier, directly from computer generated signals, without the need for those signals to be intermediately converted to another form of energy such as light energy, as is required in electrographic printers like laser printers.

Pressman discloses an electrostatic line printer incorporating a multilayered particle modulator or printhead comprising a layer of insulating material, a continuous layer of conducting material on one side of the insulating layer and a segmented layer of conducting material on the other side of the insulating layer. At least one row of apertures is formed through the multilayered particle modulator. Each segment of the segmented layer of the conductive material is formed around a portion of an aperture and is insulated from every other segment of the segmented conductive layer. Selected potentials are applied to each of the segments of the segmented conductive layer while a fixed potential is applied to the continuous conductive layer. An overall applied field projects charged particles from a particle source through the row of apertures. The density of the particle stream is modulated according to the pattern of potentials applied to the segments of the segmented conductive layer. The modulated stream of charged particles impinge upon a print-receiving medium interposed in the modulated particle stream and translated relative to the particle modulator to provide line-by-line scan printing.

A drawback to the Pressman device is that the particle source must be an airborne stream of charged particles. That stream of airborne particles is of low particle density, resulting in very poor contrast on the print-receiving medium. In addition, it is very difficult to effectively control the airborne particle stream.

U.S. Pat. No. 5,036,341 granted to Larson discloses a solution where control of many adjacent wire pairs is more effective in attracting toner particles from a magnetic toner carrier, increasing the density of toner particles deposited on the print-receiving medium and providing a more effective means of controlling particle transport. The Larson '341 patent discloses a method which begins with a stream of electronic signals defining the image information. A uniform electric field is created between a high potential on the back electrode and a low (0 volt) potential on the developer sleeve. That uniform field pattern is modified by potentials on selectable wires in a two-dimensional wire mesh array placed in the print zone. The wire mesh array consists of parallel control wires, each of which is connected to an individual voltage source, across the width of the paper surface. The multiple wire electrodes, called print electrodes, are aligned in adjacent pairs parallel to the motion of paper; the orthogonal wires called transverse electrodes are aligned perpendicular to the paper motion. All wires are initially at a $V_w$ (white) potential, preventing all toner transport from the developer sleeve. As image locations on the paper surface pass beneath wire intersections, adjacent transverse and print wire pairs are set to a $V_b$ (black) potential to produce an electrostatic field drawing the toner particles from the developer sleeve. The toner particles are pulled through the apertures being formed in the square region between four crossed wires (i.e. two adjacent rows and two adjacent columns), and deposited on a paper surface in the desired visible image pattern. The toner particle image is then made permanent by heat and pressure fusing the toner particles to the surface of the paper.

In Larson '341, one voltage source can affect a plurality of apertures, reducing the number of circuits needed for the printer. For example, in a device with M rows and N columns, the number of electronic drive circuits is reduced from M*N to M+N. This power sharing technique is termed multiplexing. However, a drawback in the device of the Larson '341 patent is that during operation of the control electrode matrix, the individual wires can be sensitive to the opening or closing of adjacent apertures, resulting in undesired printing due to the thin wire border between apertures. This defect is call cross-coupling.

International Patent Application PCT/SE90/00398, also by Larson, discloses a method to substantially reduce cross-coupling defects in the wire lattice electrode matrix by using an array of looped wires to enclose the apertures for the passage of pigment particles. Using two wires connected as a loop for each dot position results in more effective control of the adjacent wire pairs since only one electronic drive circuit is connected to each electrode loop across the linear array. The looped wire electrodes, arranged in a two-dimensional matrix of rows and columns, can be constructed as a woven wire mesh or a laminated structure using etched circuit fabrication methods. The etched circuit fabrication methods are preferred for reasons of accuracy, repeatability, and automated assembly. The woven wire mesh alternates the row and column electrode distance within each aperture so that the electrode matrix acts as if all of the electrodes are substantial at a uniform distance from the particle carrier.

However, a two-layer etched control electrode circuit does not perform well because the layer closest to the particle carrier dominates in controlling the opening and closing of apertures. The control electric fields acting between the control electrode matrix and the particle carrier are very sensitive to the distance between the control electrode matrix surface to the particle carrier surface. If the rows and columns are at different distances, as with layered circuit boards, their ability to accurately control the electric fields is greatly reduced. A single layer control electrode matrix would be more effective in controlling the apertures.

U.S. Pat. No. 5,121,144 granted to Larson shows a control electrode matrix on a single insulating layer with one circular electrode surrounding each passage to eliminate the cross-coupling. The electrodes are arranged in rows and columns on a single insulating substrate with a single electronic drive needed for each electrode. The ring electrode design requires a single electronic driver for each dot position and is effective in eliminating cross-coupling and increasing maximum print speed, but increases the complexity and manufacturing costs of the device by an undesirable amount because of the large number of electronic drivers required.

U.S. Pat. Nos. 3,689,934 and 4,814,796, and GB Patent No. 2,108,432 disclose a control electrode matrix design, each of which is also disadvantaged by the requirement of one electronic drive circuit for each aperture surrounded by an individual electrode.

Thus, there is a need for a device to control a two-dimensional array of control electrodes located on a single layer insulating substrate to reduce cross-coupling and reduce manufacturing cost.

SUMMARY OF THE INVENTION

The present invention satisfies a need for a lower cost, higher quality direct printing device. The preferred embodiment of the invention is a conventional direct printing apparatus comprising a container having toner material, a rotating sleeve within the container, a source of magnetism within the sleeve to attract the toner particles, a printhead mounted in a wall of the container, a back electrode under the container adjacent the printhead, and a sheet of plain, untreated paper caused to move between the printhead and back electrode.

The printhead comprises one or more etched circuit boards having a plurality of preferably round apertures. A potential field is set up by the back electrode creating an attractive force for the toner particles through the apertures. An electrode matrix comprising a plurality of electrodes is arranged on a circuit board with two or more electrodes adjacent or spaced around each aperture such that the multiple electrode segments form individual control electrode units. Energizing a control electrode unit surrounding a particular aperture alters the potential field set up by the back electrode to open or close the aperture to passage of toner material and thus affect the image configuration deposited onto the plain paper.

One important aspect of the present invention involves the multiplexing of the individual electrodes in each control electrode unit to reduce the number of voltage sources needed. Preferably, the control electrode units are aligned in rows and columns, although other configurations are possible, with one voltage source per row and one per column. The individual electrodes are arrayed so that each control electrode unit has at least one electrode segment in electrical communication with a row voltage source and at least one electrode segment in electrical communication with a column voltage source. The coordination of signals from the voltage sources aligned with one particular row and column combination affects the individual electrodes segments at the row and column intersection, thus control electrode unit formed of the combined segments controls the passage of toner particles.

In one embodiment, each aperture is round and the segments are approximately quarter arcs, four of which substantially surround the aperture to form a control electrode unit. One pair of diametrically opposed segments are connected in series with each similarly disposed pair of segments in adjacent control electrode units of the same row. In a like manner, the second pair of diametrically opposed segments are connected in series with each similarly disposed pair of segments adjacent control electrode units of the same column. The number and shape of the segments around each aperture is variable, the foregoing example given only as a preferred embodiment.

The segments surrounding each aperture and forming each control electrode unit are preferably connected in series by utilizing sandwiched etched circuit board techniques. Thus, a top substrate or circuit board contains the control electrode unit surrounding the plurality of apertures. This top substrate may be facing into the toner container or may in fact be sandwiched between other substrates. At least one other etched circuit board and insulation layer combination is provided to enable connection of the discrete electrode segments without crossing circuits.

In another important aspect, the rows and columns of electrode control units are preferably aligned at an angle with respect to each other. This skewing ensures complete coverage of a page by providing at least one electrode control units at every point across a line in a direction transverse to the movement of the page past the printhead. This desired coverage can also be accomplished by other arrangements of the electrode control unit such as, for example, a random pattern or even circular pattern.

In an alternate embodiment of the invention, instead of directing pigmented particles onto the information carrier, a stream of charged particles such as ions can be made to impinge upon the information carrier to establish an electrostatic latent image which can thereafter be developed according to known techniques. In this embodiment, the information carrier must include a dielectric layer capable of supporting the electrostatic latent image created by the stream of ions.

DESCRIPTION OF THE EMBODIMENTS

Figure 1A:
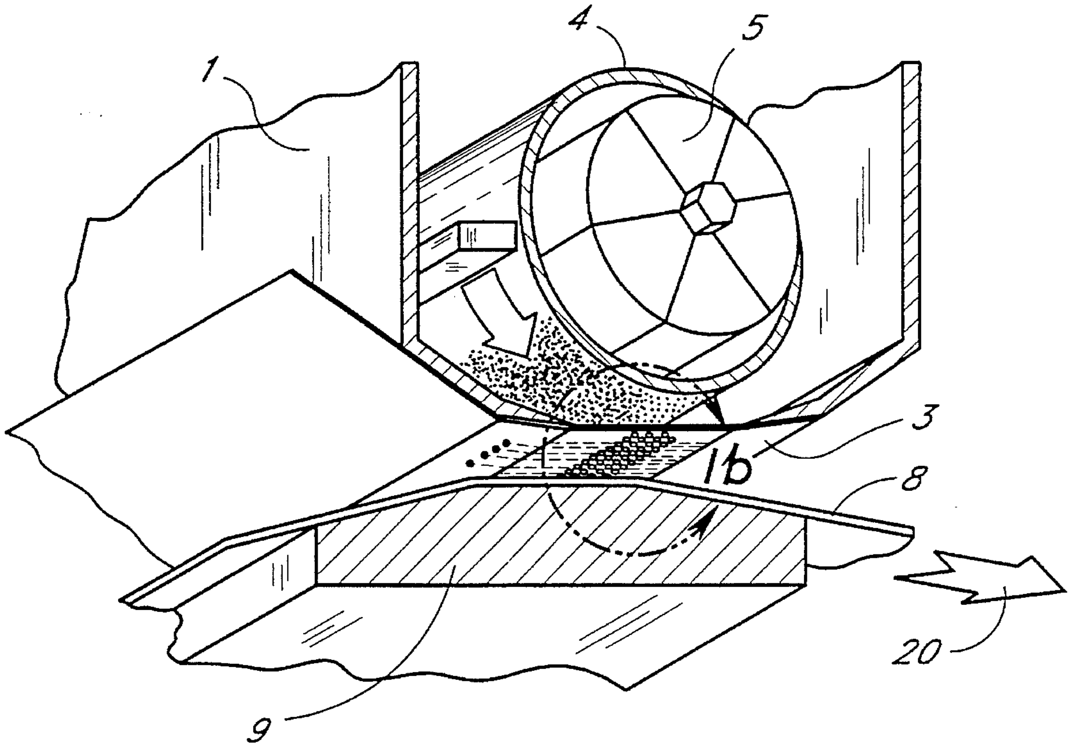
FIG. 1*a* is a schematic perspective view of a section through one embodiment of the invention.

FIG. 1 shows a printer using a preferred embodiment of the invention. A container 1 for pigment particles 2, e.g., toner, also acts as a mounting surface for a control electrode matrix 3. A particle carrier, e.g., developing roller 4 within container 1 encloses a multiple magnet core 5 for attraction of pigment particles 2 toward developing roller 4.

Figure 1B:
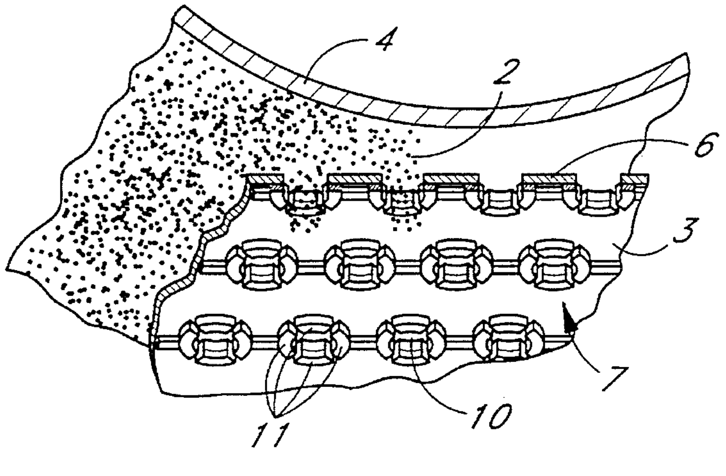
FIG. 1*b* is an enlargement of the matrix of control electrode units shown in FIG. 1*a*.

FIG. 1*b* shows the control electrode unit matrix 3 composed of an array of individual control electrode units 7 (delineated by a dashed circle), each surrounding an aperture 10, all arranged in a pattern of rows and columns. A substrate 6, such as an etched circuit board, supports the control electrode units 7 of control electrode matrix 3 and includes the apertures 10. Each control electrode unit 7 in the matrix 3 is composed of preferably four, but at least two electrode segments 11 connected through connection layers 12 (FIG. 4) beneath the visible top layer of the substrate 6.

The electrode segments 11 are preferably constructed to circumscribe the aperture 10. Thus, in the embodiment shown, the segments 11 comprise quarter arcs with four segments spaced around and substantially surrounding the round apertures. The present invention, however, is not limited to round apertures nor to a specific number of segments. It is contemplated that the apertures 10 may take any number of geometric forms, although shapes having symmetry about a central axis are advantageous due to the uniform distribution of pigment therethrough. Likewise, there may be only two electrode segments 11 or more than four, wholly depending on design criteria.

An information carrier 8 such as, for example, paper, is fed across a back electrode 9 under the electrode matrix 3 in the direction of arrow 20. The information carrier 8 may be any media suited for direct electrostatic printing. A voltage source (not shown) connected to the back electrode 9 attracts charged pigment particles 2 from developing roller 4, through apertures 10, to the information carrier 8. Control voltage signals (not shown) connected to the control electrode units 7 in the matrix 3 create electric fields which permit or restrict toner transport from the developer sleeve. In effect, these electric fields "open" or "close" the apertures 10 to passage of toner particles by influencing the attractive force from the back electrode 9. Varying the control voltage signals produces a visible image pattern on the information carrier 8 corresponding to the pattern of the open and closed apertures.

Figure 2:
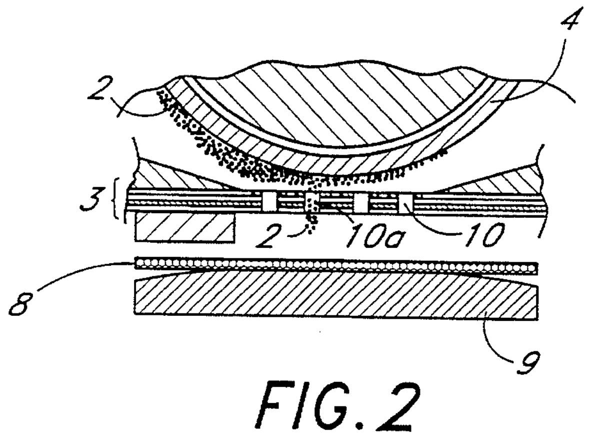
FIG. 2 is a section through the print zone of FIG. 1.

FIG. 2 shows a section through the print zone of FIG. 1. Control electrode matrix 3 is shown to be constructed of several control electrode units and connecting layers. Control electrode matrix 3 is shown with one control electrode unit in the print condition where pigment particles pass through one of the apertures 10a to deposit on the information carrier 8. Although it is preferred to utilize an electrode matrix with apertures, where pigment particles pass through the apertures 10*a* to deposit on the information carrier 8, it is not necessarily critical to the inventive aspects of the present invention. For instance, the information carrier 8 could be fed across the top of the electrode matrix 3. In this embodiment, control voltage signals connected to the control electrode units 7 of matrix 3 would create electric fields permitting or restricting toner transport from the developer sleeve directly onto the information carrier without passage through an aperture.

Figure 3:
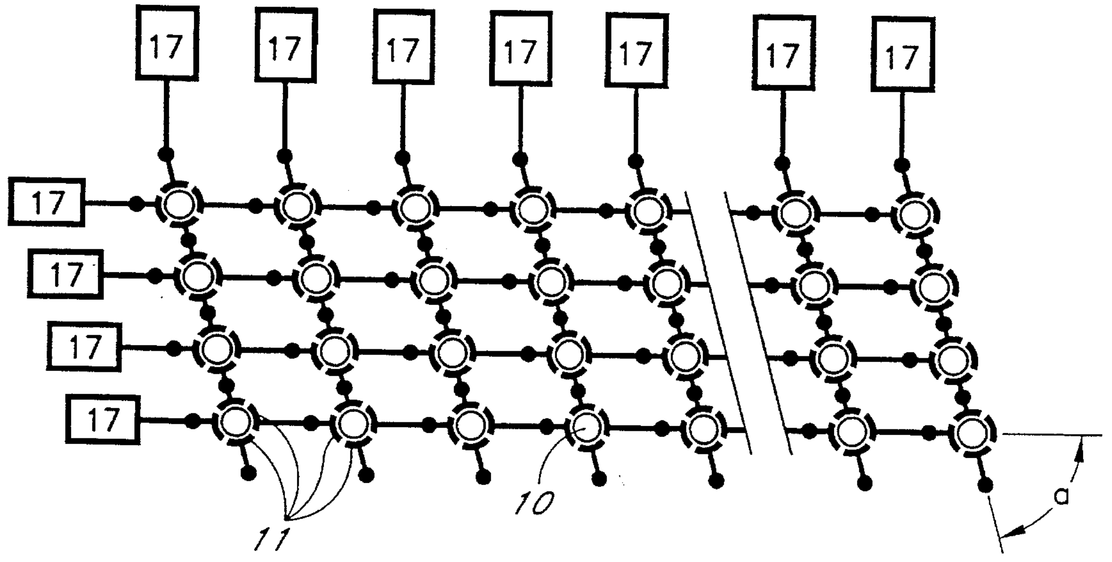
FIG. 3 is a schematic plan view of the matrix of control electrode units.

FIG. 3 is a schematic plan view of a preferred control electrode matrix 3 as seen from the developing roller 4. Each aperture 10 is surrounded by a control electrode unit 7 comprised of individual electrode segments 11 connected in rows and columns through connection layers 12, shown in FIG. 4. The parallel rows are arranged at an angle $\alpha$ with respect to the parallel columns where the angle $\alpha$ is not 90 degrees. This skewing ensures complete coverage of an information carrier by providing at least one control electrode unit at every point across a line in a direction transverse to the movement of the information carrier denoted by arrow 20 in FIG. 1*a*. However, although it is preferred to skew the rows and columns, it is not necessarily critical to the inventive aspects of the present invention.

Voltage sources 17 are shown connected to each row and column of control electrode units 7 on matrix 3. In the nonprint condition, each voltage source 17 supplies voltage $V_w$ to its associated row or column to prevent the passage of pigment particles through the apertures. In the print condition, each voltage sources 17 supplies a different voltage $V_b$ to its associated row or column to allow the passage of pigment particles through the apertures. If either the row or the column voltage source is at voltage $V_w$, the aperture is closed to passage of charged pigment particles. When both row and column voltage sources are at voltage $V_b$, the aperture is open to passage of charged pigment particles.

In some instances, the voltages from the sources 17 may be in between $V_w$ and $V_b$. In this case, the passages will be partially opened, allowing less pigment through than that required to make a dark image on the carrier 8. Shades of pigment are thus created resulting in grey-scale capability and enhanced control of the image reproduction.

Figure 4:
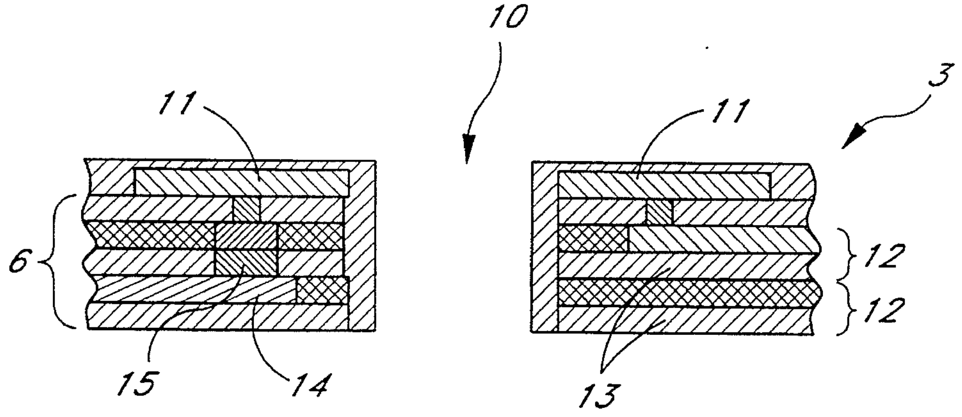
FIG. 4 is a section through a control electrode unit of FIG. 3.

FIG. 4 shows a section through a control electrode unit 7 of matrix 3 of FIG. 1*b*. Electrode segments 11 located on substrate 6 are electrically connected through one or more connection layers 12 of the substrate. Each connecting layer 12 is composed of an insulating material 13 with electrical conductor material on its surface in horizontal patterns 14 or through its volume in vertical patterns 15. The several layers of substrate 6 are bonded together in accurate alignment by adhesive material.

Figure 5:
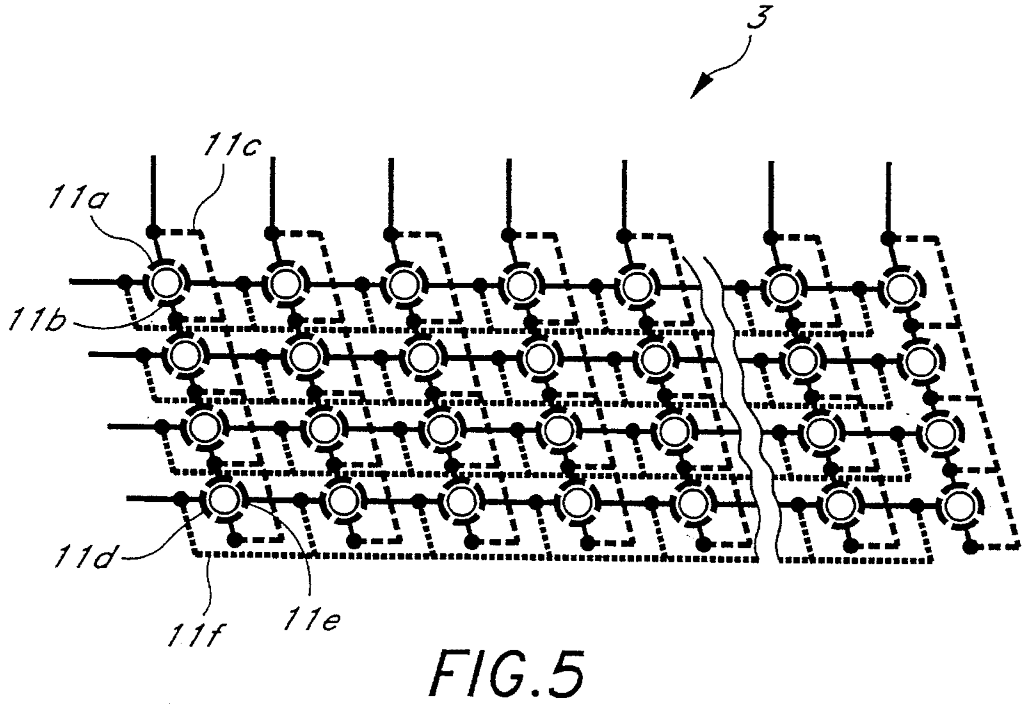
FIG. 5 is a schematic view of the control electrode unit matrix with two connecting layers visible as hidden line figures.

FIG. 5 shows the control electrode matrix 3 of FIG. 3 with interconnection layers visible as dashed lines. Thus, for instance, electrode segment 11*a* is connected in series with electrode segment 11*b* of the same control electrode unit by connecting line 11*c* in the connecting layer 12. Similarly, electrode segment 11*d* is connected to electrode segment 11*e* of the same control electrode unit by connecting line 11*f* in a second connecting layer. Those skilled in the art of etched circuit design will recognize that numerous design variations will accomplish the desired result. For instance, one of the connecting layer connection patterns can be etched in the top substrate layer to reduce the number of interior connecting layers, although the invention is not limited in the number of connecting layers that are used.

Figure 6:
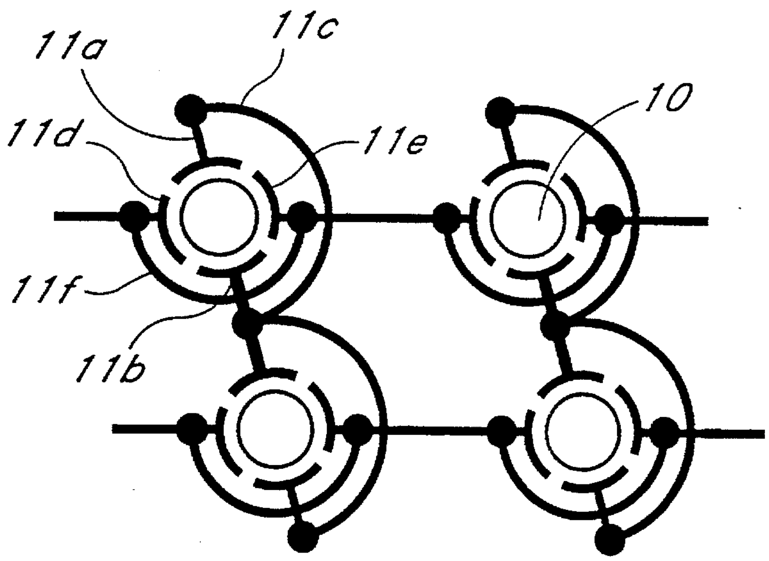
FIG. 6 is a schematic view of a portion of a control electrode matrix with only one connecting layer.

FIG. 6 shows one example of connecting lines 11*c* on the same layer with electrode segments 11*a*, 11*b*, 11*d*, and 11*e*. Connecting lines 11*f* are shown as hidden lines on a connecting layer below the control electrode unit layer.

Figure 7:
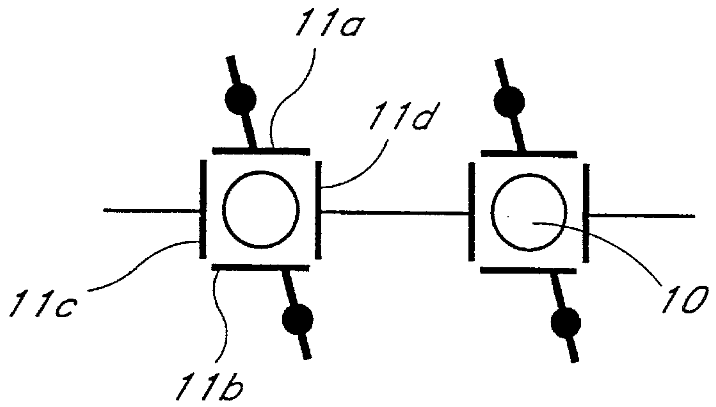
FIG. 7 is a schematic view of an alternative embodiment of the control electrode matrix using linear shaped segments.

FIG. 7 shows another embodiment of the invention with each control electrode unit composed of straight or linear electrode segments. The invention is not limited in the shape or number of electrode segments that are used.

According to the first embodiment of the present invention, therefore, it becomes possible to provide an inexpensive image forming apparatus which has a simple structure which can accurately control the toner particles passage through the apertures. Furthermore, the electric fields generated by the image signals can be prevented from being disturbed, so that it is possible to obtain a clear image on the support member. The invention results in high quality printing with a significant reduction in cross-coupling while reducing the manufacturing cost in comparison to printers that use a matrix of individual electrodes.

The above-described use of one voltage source 17 per row and one per column allows M rows and N columns to be controlled by M+N voltage source electronic drivers, reducing the number from the M×N drivers needed for one electronic driver for each electrode, as in some prior art. Furthermore, the use of control electrode units comprised of multiple electrode segments surrounding apertures substantially reduces the occurrence of cross-coupling inherent in prior multiplexing print devices.

The foregoing description should be taken as illustrative and not as limiting. It is possible to apply the invention to other printing methods that also utilize apertures and a control electrode matrix to control the flow of charged particles to an information carrier. Accordingly, the invention is not strictly limited to the specific methods and devices described herein.

What is claimed is:

1. An image recording apparatus for depositing charged particles in an image configuration on an information carrier, comprising:

a) a back electrode;

b) a particle source positioned to convey said charged particles to a position adjacent to the back electrode;

c) a particle receiving information carrier positioned between the back electrode and the particle source;

d) an electrode matrix formed on a single surface of a substrate layer interposed between the back electrode and the particle source, said electrode matrix disposed adjacent to the information carrier, the electrode matrix comprising a plurality of control electrode units, each unit comprising a plurality of separate electrode segments;

e) a first voltage source connected to apply an electrostatic potential to said back electrode, said electrostatic potential having sufficient magnitude to initiate transport of charged particles from said particle source to the information carrier; and f) a plurality of variable voltage source with control circuitry connected to apply control potentials to at least one electrode segment of each control electrode unit, said control potentials having sufficient magnitude to selectively permit and restrict transport of the charged particles from the particle source to the information carrier.

2. The apparatus of claim 1 wherein the substrate has a plurality of apertures, at least one of which is located substantially in the center of the electrode segments which form a control electrode unit; said apertures arrayed in a pattern for effecting the transfer of particles through the apertures and onto the information carrier.

3. The apparatus of claim 1 wherein the charged particles deposited on an information carrier produce a visible image pattern.

4. The apparatus of claim 3 wherein the charged particles are pigment particles.

5. The apparatus of claim 1 wherein said particle source comprises a rotating sleeve which encloses a multiple magnet core for the attraction of particles toward said rotating sleeve.

6. The apparatus of claim 4 wherein a container for holding pigment particles, also supports the electrode matrix.

7. The apparatus of claim 1 wherein the charged particles deposited on an information carrier produce a latent electrostatic image pattern.

8. The apparatus of claim 1 wherein the information carrier is comprised of a dielectric material.

9. The apparatus of claim 1 wherein the electrode segments are arc shaped.

10. The apparatus of claim 1 wherein the electrode segments are linearly or rectangularly shaped.

11. The apparatus of claim 1 wherein the control electrode units are arranged in parallel rows and parallel columns.

12. The apparatus of claim 11 wherein at least one electrode segment in each control electrode unit in each row is in electrical series connection, and wherein at least one electrode in each control electrode unit in each column is in electrical series connection.

13. The apparatus of claim 11 wherein the rows are arranged at an angle other than 90 degrees to the columns.

14. The apparatus of claim 12 wherein each voltage source supplies voltage $V_w$ to its associated row or column, such that if either the row or the column voltage source is at voltage $V_w$, the passage is closed to passage of charged particles and a nonprint condition exists at that passage.

15. The apparatus of claim 12 wherein each voltage source supplies voltage $V_b$ to its associated row or column, such that if both the row and the column voltage source is at voltage $V_b$, the passage is open to passage of charged particles and a print condition exists at that aperture.

16. The apparatus of claim 1 wherein the control electrode units are located on a single layer of the substrate.

17. A method of printing in which an electrical potential pattern is produced by an electrode matrix arranged on a single surface of a substrate layer disposed between a particle source and a back electrode, said electrode matrix comprising a plurality of control electrode units, each control electrode unit comprising separate electrode segments comprising the steps of:

a) applying an electrostatic potential to the back electrode, said electrostatic potential having sufficient magnitude to initiate transport of particles from the particle source to the information carrier;

b) connecting voltage sources with control circuitry to at least one segment of each control electrode unit; and c) supplying from said voltage sources a pattern of electrical potentials to the electrode matrix, said electrical potentials having sufficient magnitude to permit and restrict transport of particles from the particle source to the information carrier.

18. A method of making an image recording apparatus for depositing particles in an image configuration on an information carrier, comprising the steps of:

a) positioning a particle source for conveying said particles adjacent to a back electrode;

b) positioning an image receiving information carrier between the back electrode and said particle source;

c) positioning an electrode matrix formed on a single surface of a substrate layer adjacent to the information carrier, said electrode matrix comprising a plurality of control electrode units, each electrode unit comprising a plurality of segmented electrode sections;

d) connecting a first voltage source to the back electrode to apply an electrostatic potential to the back electrode sufficient to initiate passage of the particles from the particle source to the information carrier; and e) connecting at least one variable voltage source with control circuitry to the segmented electrode sections of each control electrode unit to apply control potentials to the electrode matrix sufficient to permit and restrict passage of the particles from the particle source to the information carrier.

19. A printhead for direct electrostatic printing comprising:

a) a substrate layer having an insulating surface region and an array of apertures disposed therethrough; and b) a matrix of control electrode units formed on the insulating surface region, each electrode unit comprising a plurality of segmented electrode sections disposed substantially adjacent to an aperture.

20. The printhead of claim 19, wherein the segmented electrode sections are electrically connected in a multiplexed arrangement.

21. A method of electrostatic printing comprising the steps of:

b) positioning an image receiving medium adjacent to an array of control electrode units disposed on a single surface of a substrate layer, each control electrode unit comprising a plurality of segmented electrode sections, said array of control electrode units disposed between a source of toner particles and a back electrode;

b) conveying toner particles to a position adjacent to the back electrode;

c) applying an electrostatic potential to the back electrode, said electrostatic potential having sufficient magnitude to initiate passage of toner particles from the source of toner particles to the image receiving medium;

d) applying a plurality of control potentials to the array of control electrode units, said control potentials having sufficient magnitude to permit and restrict passage of toner particles from the source of toner particles to the image receiving medium.

22. The method of claim 21, wherein the control potentials are generated by multiplexing sources of electrostatic potential.

* * * * *